US010772775B2

(12) United States Patent
Delmatoff et al.

(10) Patent No.: US 10,772,775 B2
(45) Date of Patent: Sep. 15, 2020

(54) ADJUSTABLE WHEELCHAIR SUSPENSION ASSEMBLY

(71) Applicant: Nut Industries, Jurupa Valley, CA (US)

(72) Inventors: Peter J. Delmatoff, Jurupa Valley, CA (US); Mike Stephen Box, Wharton, TX (US)

(73) Assignee: NUT INDUSTRIES, Jurupa Valley, CA (US)

( * ) Notice: Subject to any disclaimer, the term of this patent is extended or adjusted under 35 U.S.C. 154(b) by 132 days.

(21) Appl. No.: 15/947,616

(22) Filed: Apr. 6, 2018

(65) Prior Publication Data
US 2018/0296410 A1    Oct. 18, 2018

Related U.S. Application Data

(60) Provisional application No. 62/485,803, filed on Apr. 14, 2017.

(51) Int. Cl.
*A61G 5/10*  (2006.01)
*B60B 33/04* (2006.01)
*B60B 33/00* (2006.01)

(52) U.S. Cl.
CPC .......... *A61G 5/1078* (2016.11); *B60B 33/045* (2013.01); *B60B 33/0044* (2013.01); *B60B 2200/22* (2013.01); *B60B 2200/26* (2013.01); *B60B 2900/131* (2013.01); *B60Y 2200/84* (2013.01)

(58) Field of Classification Search
CPC ..... B60B 33/045; B60B 33/04; B60B 220/26; B60B 2200/22; B60B 2900/84; A61G 5/1078; B60Y 2200/84

USPC ............................. 16/18 R, 19, 44; D8/375
See application file for complete search history.

(56) References Cited

U.S. PATENT DOCUMENTS

| 1,835,144 A | * | 12/1931 | Cleaveland | ............. B60B 33/04 |
| | | | | 16/34 |
| 2,915,776 A | * | 12/1959 | Hanson | ................. B60B 33/045 |
| | | | | 16/44 |
| 4,078,817 A | * | 3/1978 | Ferguson | ................. A61G 5/10 |
| | | | | 267/249 |

(Continued)

FOREIGN PATENT DOCUMENTS

DE          1032674     *   6/1958

*Primary Examiner* — Anne Marie M Boehler
(74) *Attorney, Agent, or Firm* — Klein, O'Neill & Singh, LLP

(57) ABSTRACT

A caster wheel suspension assembly for a wheelchair or the like includes a housing with a clevis portion and a tubular portion; a fork member pivotably mounted in the clevis portion of the housing, the fork member having a pair of fork arms extending from the housing, each of the fork arms terminating in a lower end, the fork member having an upper portion formed as a clevis tang disposed in the clevis portion of the housing; a damping element in the tubular portion of the housing; and a compression adjustment element connected to the clevis pin and extending axially through the damping element. The compression adjustment element is configured to apply an adjustable compressive force to the damping element, and it is further configured to be moved axially within the tubular portion of the housing for adjustment of the compressive force applied to the damping element.

16 Claims, 3 Drawing Sheets

(56) References Cited

U.S. PATENT DOCUMENTS

| | | | | |
|---|---|---|---|---|
| 5,347,680 A | * | 9/1994 | Rippe | B60B 33/0042 16/18 R |
| 5,400,469 A | * | 3/1995 | Simonsen | B60B 33/045 16/20 |
| 5,967,535 A | * | 10/1999 | King | B60B 33/0002 16/35 R |
| 6,357,077 B1 | * | 3/2002 | Jones, Jr. | B60B 33/045 16/35 D |
| 6,539,578 B1 | * | 4/2003 | Guttmann | B60B 33/0018 16/44 |
| 9,327,553 B2 | * | 5/2016 | Woodrum | B60B 33/045 |
| 2003/0019982 A1 | * | 1/2003 | Wing | B60B 1/006 248/188.8 |
| 2007/0143957 A1 | * | 6/2007 | Baek | B60B 33/045 16/44 |
| 2008/0116660 A1 | * | 5/2008 | Nicholls | A61G 5/10 280/286 |

* cited by examiner

ADJUSTABLE WHEELCHAIR SUSPENSION ASSEMBLY

CROSS-REFERENCE TO RELATED APPLICATION

This application claims priority, under 35 U.S.C. § 119(e), from U.S. Provisional Application No. 62/485,803, filed Apr. 14, 2017, the disclosure of which is incorporated herein by reference in its entirety.

FEDERALLY SPONSORED RESEARCH OR DEVELOPMENT

Not applicable.

BACKGROUND

This disclosure relates generally to the field of wheelchairs and like conveyances. More specifically, it relates to a suspension assembly for the front caster wheels of a wheelchair, and particularly to a suspension assembly having an adjustable vibration-damping mechanism.

The small front caster wheels commonly found in many wheelchairs are subject to vibration when traversing a bumpy, rough, or uneven surface. This vibration, when transmitted through the chair frame to the wheelchair seat, can cause discomfort for the user. Consequently, it would be advantageous to provide a caster wheel suspension device that can substantially reduce, or damp, such vibrations. It would be further advantageous to provide such a device with the capability of adjusting the degree of dampening or shock-absorption, whereby the user can selectively adjust the mechanism to provide a stiffer ride or a softer ride. Effective, preferably adjustable, shock-absorption would be particularly advantageous in wheelchairs used in athletic activities or on unpaved outdoor surfaces.

SUMMARY

An adjustable wheelchair suspension assembly in accordance with aspects of this disclosure includes a housing having a U-shaped clevis portion in which a fork member is pivotably mounted, the fork member comprising a pair of spaced-apart fork arms extending from the housing and terminating in lower ends configured for rotatably receiving an axle carrying a caster wheel. The fork member has an upper portion formed as a clevis tang disposed in the clevis portion of the housing, to which it is connected by a pivot pin, so that the fork member is pivotably mounted within the housing. The housing further includes a tubular portion containing a shock-absorbing vibration damper subassembly. The vibration damper subassembly comprises a damping element mounted in the tubular portion of the housing between a seat inside the housing and a compression cap at the open outer end of the tubular housing portion. The compression cap is engaged by the head of a compression adjustment element extending axially through a central aperture of the compression cap, and then through the damping element and the seat into the clevis portion of the housing. The compression adjustment element may be configured as a screw with a threaded end received in a threaded radial bore in a clevis pin fixed in the clevis tang.

The damping element is placed under compression by the cantilevered fork member acting through its inner clevis tang portion and the clevis pin, whereby the screw is pulled toward the seat, thereby exerting a compressive force on the damping element through the compression cap. The damping element, being under compression, tends to absorb shock and damp vibration transmitted to the fork ends by a wheel and axle mounted between them. The degree of vibration damping and shock absorption provided by the vibration damper subassembly is a function of the initial (static) compression of the damping element, which may be adjusted by threading the screw into or out of the clevis pin bore.

DETAILED DESCRIPTION

Figure 5:
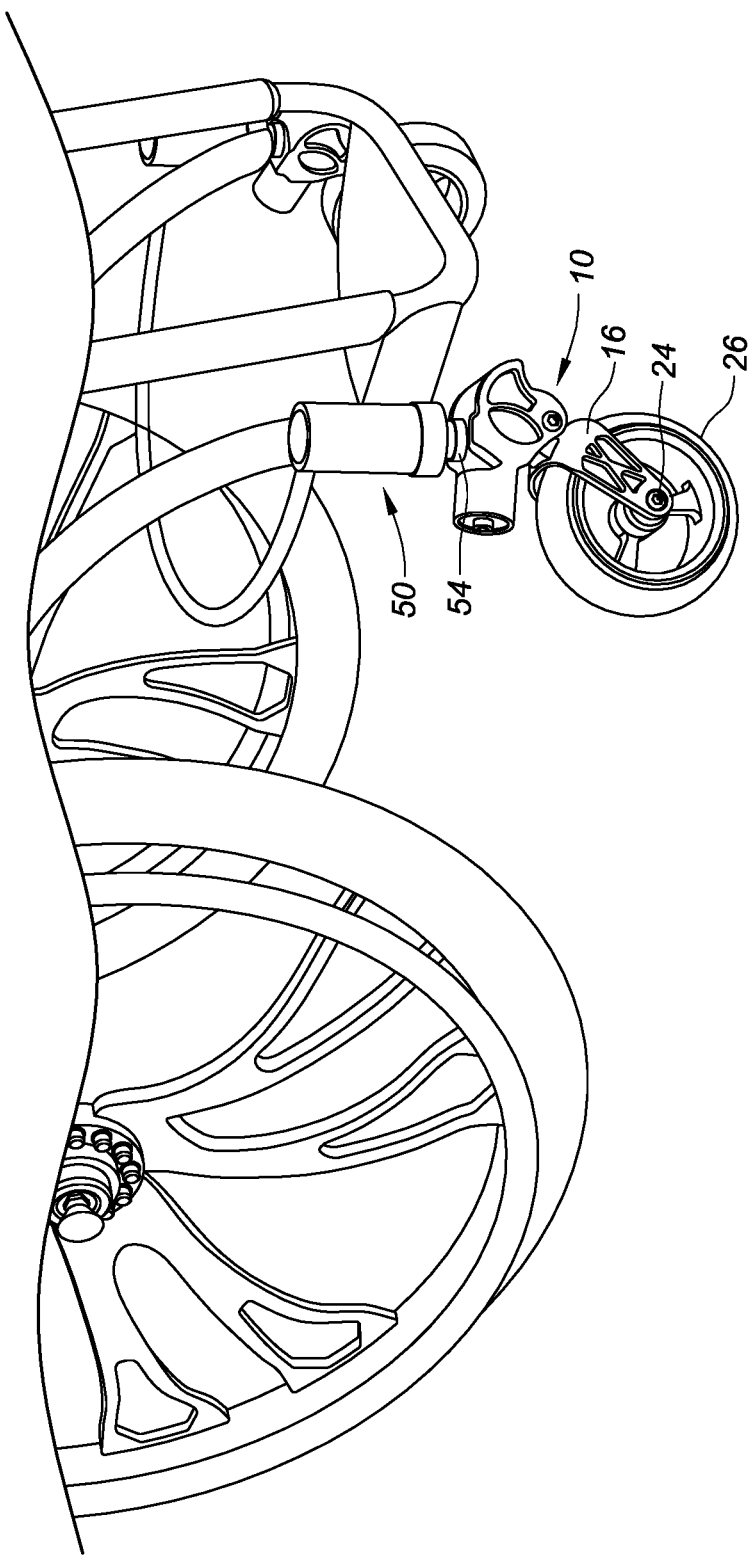
FIG. 5 is a view of the suspension assembly attached to a wheelchair frame, with a caster wheel and axle mounted in the suspension assembly.

An adjustable wheelchair suspension assembly 10 in accordance with aspects of this disclosure is shown in the drawings. The suspension assembly 10 includes a housing 12 having a U-shaped clevis portion 14 in which a fork member 16 is pivotably mounted by a pivot pin 17. The fork member 16, in turn, comprises a pair of spaced-apart fork arms 18 extending downward and rearward from the housing 12 and terminating in lower ends 20. The lower end 20 of each the fork arms 18 has an aperture 22, each of which receives an end of an axle 24 carrying a caster wheel 26, as shown in FIG. 5, whereby the axle 24 is rotatably mounted between the lower ends 20 of the fork arms 18.

The fork member 16 has an upper portion formed as a clevis tang 28 disposed in the clevis portion 14 of the housing 12, to which it is connected by a pivot pin 17, so that the fork member 16 is pivotably mounted within the housing 12. The housing 12 further includes a tubular portion 32, extending rearward from the clevis portion 14, which contains a shock-absorbing vibration damper subassembly, described below.

The vibration damper subassembly comprises a resilient, compressible damping element, which may advantageously be a coil spring 34 or the functional equivalent thereof (e.g., a rubber bushing), mounted axially in the tubular portion 32 of the housing 12 between a seat 36 inside the housing 12 and a compression cap 38 at the open outer end of the tubular housing portion 32. The damping element or spring 34 is thus axially constrained within the tubular portion 32 of the housing 12. The compression cap 38 has a central aperture 40 through which a compression adjustment element 42 passes, as further described below.

The compression adjustment element 42 has a first end formed as a head 44 that engages against the outer surface of the compression cap 38, preferably through a washer. Preferably, the compression cap 38 is formed of aluminum, and the washer 45 (if present) is formed of stainless steel, although other materials may be used. The washer 45 (if present) advantageously has a relatively close fit around the compression adjustment element 42, e.g., with about a 0.008 in. 0.02 mm clearance, although this dimension is not critical. The compression cap 38, however, should preferably fit loosely within the open outer end of the tubular portion 32 of the housing 12.

Figure 3:
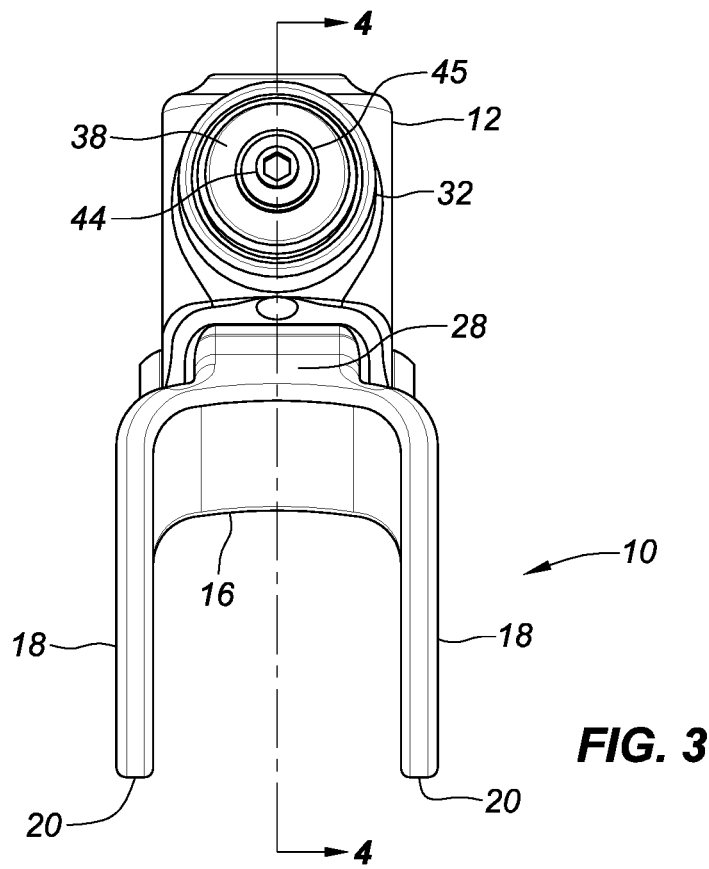
FIG. 3 is a rear elevation view of the suspension assembly of FIG. 1.

Because of the loose fit of the compression cap 38 within the tubular housing portion 32, liquid may enter the tubular housing portion 32 through its open outer end. To permit drainage of such liquid, a drain passage 47 is provided at or near the inner end of the tubular housing portion 32, whereby liquid entering the tubular housing portion 32 can drain to the exterior of the housing 12. Thus, in the embodiment shown in FIG. 3, the compression adjustment element 42 passes axially through the washer 45, the central aperture 40 of the compression cap 38, through the coil spring 34, and the spring seat 36, and into the clevis portion 14 of the housing 12, where it is connected to the clevis tang 28 by means of a clevis pin 30 fixed in the clevis tang 28. The compression adjustment element 42 has an axis that is perpendicular to the axis of the clevis pin 30. In the embodiments represented by FIG. 3, the compression adjustment element 42 is a screw having a threaded second end 46 opposite the head 44, the second end being received in a threaded radial bore 48 in the clevis pin 30.

Figure 1:
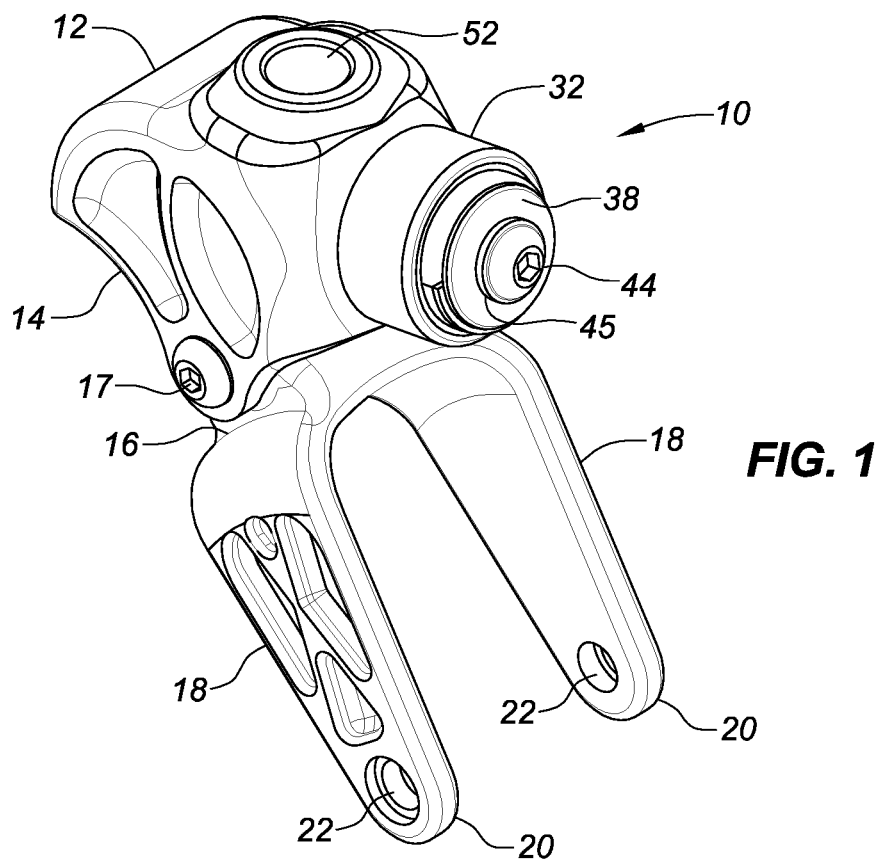
FIG. 1 is a perspective view of an adjustable wheelchair suspension assembly in accordance with aspects of this disclosure.
Figure 2:
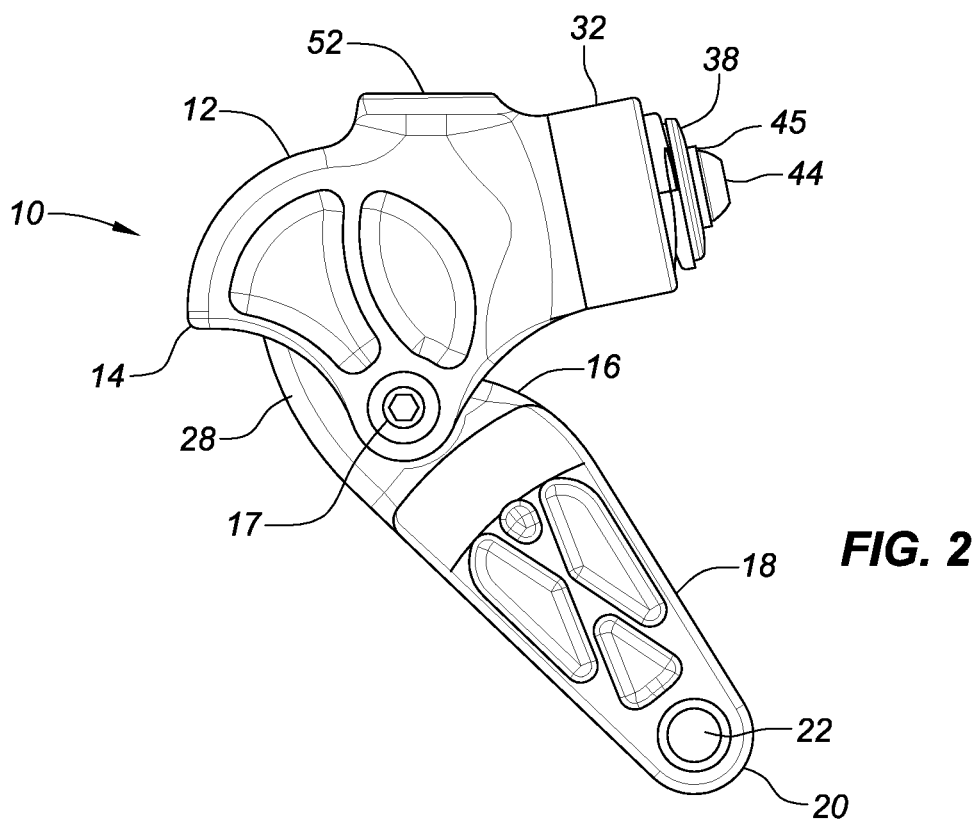
FIG. 2 is a side elevation view of the suspension assembly of FIG. 1.

As shown in FIG. 5, the suspension assembly 10 may be secured to a wheelchair 50 as would be a conventional caster wheel assembly. To this end, the housing 12 has an upper surface provided with a socket 52 (see FIGS. 1, 2, 4), configured and dimensioned to receive a wheelchair frame member 54 for rotatable attachment of the suspension assembly 10 to the front of the wheelchair 50, as shown in FIG. 5. For example, the socket 52 may be configured and dimensioned to receive a frame stub (not shown) that is secured within the socket 52 for rotation therein, as with conventional wheelchair caster wheel assemblies. The tubular housing portion 32, containing the vibration damper subassembly, extends rearward from the socket 52, so as not to interfere with the installation of the suspension assembly 10 on the wheelchair 50, or with the rotation of the suspension subassembly 10 with the installed wheel 26 and axle 24 relative to the wheelchair frame.

In operation, the spring 34 is placed under compression by the fork member 16 acting through its clevis tang portion 28 and the clevis pin 30, whereby the compression adjustment element 42 is pulled toward the spring seat 36, thereby pre-loading the positionally-constrained spring 34 with a compressive force through the compression cap 38. The spring 34, being under compression, tends to absorb shock and damp vibrations transmitted to the fork ends 18 by the wheel 26 and axle 24 mounted between them. The degree of vibration damping and shock absorption provided by the vibration damper subassembly is a function of the spring constant of the spring 34, and of the initial (static) compression (pre-loading) of the spring 34, which may be adjusted by threading the compression adjustment element 42 into or out of the clevis pin bore 48. In some embodiments of this disclosure, a spring 34 having a spring constant or spring rate of around 550 lb./in. is preferable. One such spring is available from McMaster-Carr of Santa Fe Springs, Calif., under part no. 9573K62.

Advantageously, the spring 34 may be easily replaced with another spring having a different spring constant, and thus providing a mechanism for what may be called a "coarse" adjustment of the vibration damping qualities, and thus the stiffness or softness of the wheelchair's ride, provided by the suspension assembly 10. According to this aspect of the disclosure, the compression adjustment element 42 is unthreaded from the clevis pin bore 30 and removed from the tubular housing portion 32. The spring 34 is then removed and replaced with a new spring having the desired spring constant, and the compression adjustment screw is then reinstalled by inserting it through the compression cap 38 and the spring 34, and finally threading into the clevis pin bore 30 with the desired degree of tightness to "fine-tune" the ride quality.

Figure 4:
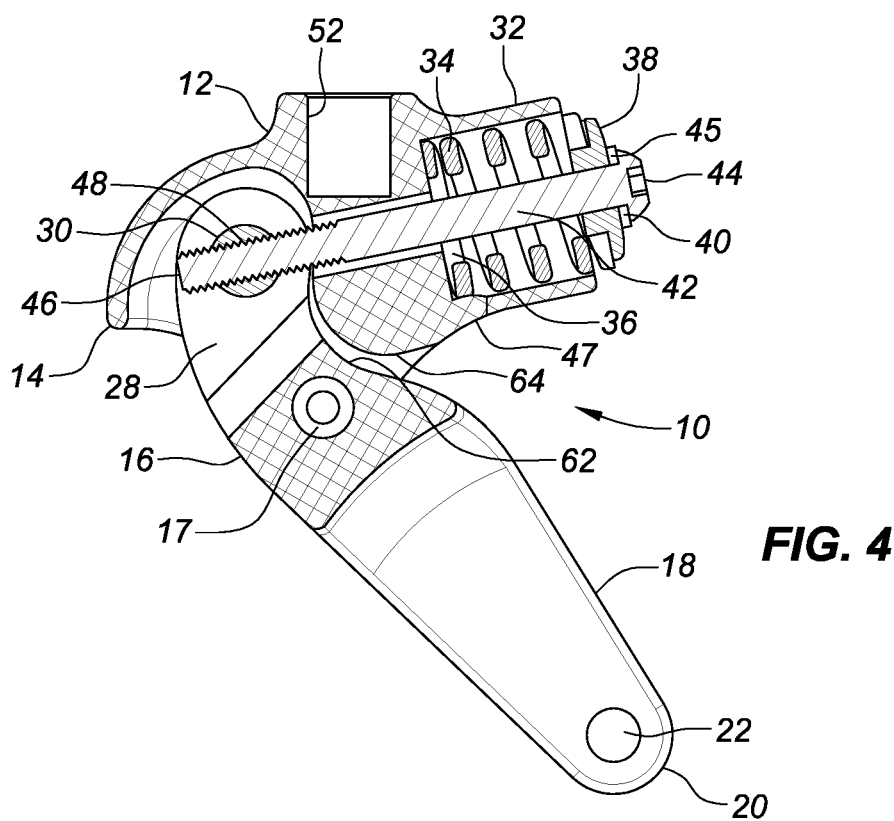
FIG. 4 is a cross-sectional view of the suspension assembly of FIG. 1, taken along line 4-4 of FIG. 3.

Advantageously, the suspension assembly 10 may have an internal feature that inhibits or reduces the probability of the suspension assembly 10 collapsing in the event of breakage of the spring 34. Such a feature may be integrated into the suspension assembly 10 by the respective contours of an arcuate recess 62 in the upper portion of the fork member 16 and a curved bumper 64 of the housing 12, as shown in FIG. 4, so that if the spring 34 breaks the fork member 16 will pivot toward the housing 12 to only a limited extent.

The above description, accompanied by the drawings, presents only an exemplary embodiment of the subject matter of the disclosure, and is not meant to limit the scope or construction of the disclosure in any way. The disclosure is intended to encompass what is explicitly disclosed as well and any structural and/or functional equivalents thereof. Moreover, modifications and variations of the explicitly described subject matter of the disclosure may suggest themselves to those skilled in the art, and the disclosure should be construed to encompass any and all such modifications and variations.

The invention claimed is:

1. A caster wheel suspension assembly for a wheelchair, comprising:
   a housing comprising a clevis portion and a tubular portion having an open end;
   a fork member pivotably mounted in the clevis portion of the housing, the fork member comprising a pair of fork arms extending from the housing, each of the fork arms terminating in a lower end, the fork member having an upper portion formed as a clevis tang disposed in the clevis portion of the housing;
   a damping element contained in the tubular portion of the housing; and
   a compression adjustment element extending axially through the damping element, the compression adjustment element having a first end disposed at the open end of the tubular portion of the housing so as to apply an adjustable compressive force to the damping element, the compression adjustment element having a second end connected to the clevis tang;
   wherein the compression adjustment element is configured to be moved axially within the tubular portion of the housing for adjustment of the compressive force applied to the damping element.

2. The caster wheel suspension assembly of claim 1, wherein the damping element comprises a coil spring.

3. The caster wheel suspension assembly of claim 1, wherein the compression adjustment element is connected to the clevis tang by a clevis pin.

4. The caster wheel suspension assembly of claim 3, wherein the second end of the compression adjustment element is threaded and received in a threaded radial bore in the clevis pin.

5. The caster wheel suspension assembly of claim 1, further comprising a compression cap disposed at the open end of the tubular portion of the housing and engaged against the damping element, wherein the compression cap has an aperture through which the compression adjustment element passes, and wherein the first end of the compression adjustment element includes a head engaged against the compression cap so as to apply a compressive force to the damping element through the compression cap.

6. The caster wheel suspension assembly of claim 1, wherein the lower end of each of the fork arms includes an aperture configured to accommodate an axle.

7. The caster wheel suspension assembly of claim 5, wherein the damping element is disposed between the compression cap and a seat within the tubular portion of the housing.

8. A method of providing adjustable vibration damping in a wheelchair caster wheel suspension assembly, comprising:
   providing a housing comprising a clevis portion and a tubular portion;
   pivotably mounting a fork member in the clevis portion of the housing, whereby the fork member is pivotably mounted within the housing, the fork member comprising a clevis tang disposed in the clevis portion of the housing and a pair of fork arms extending from the clevis tang, each of the fork arms terminating in a lower end configured to rotatably receive a caster wheel axle;
   providing a damping element positionally constrained within the tubular portion of the housing;
   extending a compression adjustment element axially through the damping element so that a first end of the compression adjustment element applies a compressive force to the damping element, and so that a second end of the compression adjustment element is connected to the clevis tang; and
   adjusting the compressive force applied by the compression adjustment element to the damping element by moving the compression adjustment axially within the tubular portion of the housing relative to the damping element.

9. The method of claim 8, wherein the damping element is a coil spring.

10. The method of claim 8, wherein the first end of the compression adjustment element applies a compressive force to the damping element through a compression cap disposed in the tubular portion of the housing so as to engage with the damping element.

11. The method of claim 8, wherein the second end of the compression adjustment element is connected to the clevis tang by a threaded fitting, and wherein the compression adjustment element is moved axially by threading the compression adjustment into and out of the threaded fitting.

12. A wheelchair caster wheel suspension assembly, comprising:
   a housing having a clevis portion and a tubular portion;
   a fork member pivotably mounted in the clevis portion of the housing, the fork member comprising a pair of fork arms extending from the housing, each of the fork arms terminating in a lower end, the fork member having an upper portion formed as a clevis tang connected to the clevis portion of the housing by a pivot pin;
   a damping element mounted in a compressively loaded position within the tubular portion of the housing between a seat inside the housing and a compression cap at an open outer end of the tubular portion of the housing; and
   a compression adjustment element extending axially through a central aperture of the compression cap, and then through the damping element and the seat into the clevis portion of the housing, the compression adjustment element having a first end engaging the compression cap and a second end connected to the clevis tang, whereby the compression adjustment element applies an adjustable compressive force from the clevis tang to the damping element through the compression cap;
   wherein the compression adjustment element is configured to be moved axially within the tubular portion of the housing for adjustment of the compressive force applied to the damping element.

13. The wheelchair suspension assembly of claim 12, wherein the damping element comprises a coil spring.

14. The wheelchair suspension assembly of claim 12, wherein the second end of the compression adjustment element is threaded and is received in a threaded radial bore in the clevis pin.

15. The wheelchair suspension assembly of claim 12, wherein the compression cap has an aperture through which the compression adjustment element passes, and wherein the first end of the compression adjustment element includes a head engaged against the compression cap so as to apply a compressive force to the damping element through the compression cap.

16. The wheelchair suspension assembly of claim 12, wherein the lower end of each of the fork arms includes an aperture configured to accommodate an axle.

* * * * *